May 31, 1932.     G. E. BISHOP     1,860,983
AUTOMOBILE DOOR CURTAIN
Filed July 18, 1930
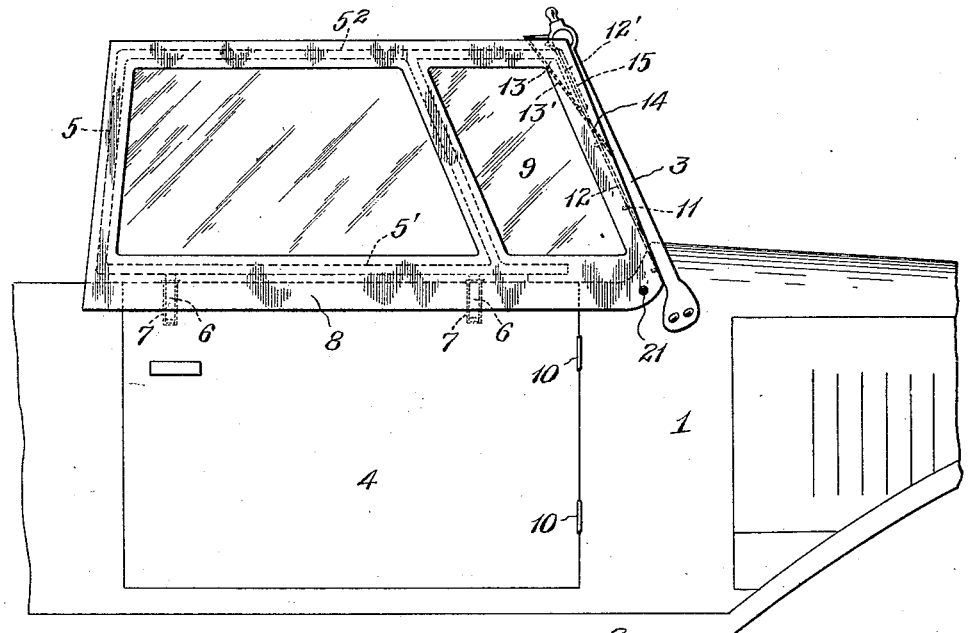
FIG. 1.
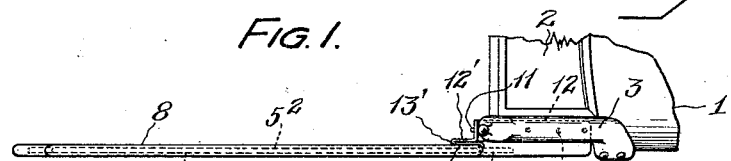
FIG. 2
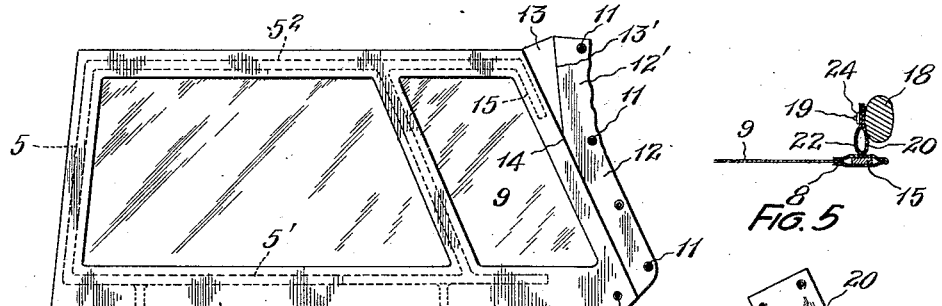
FIG. 3
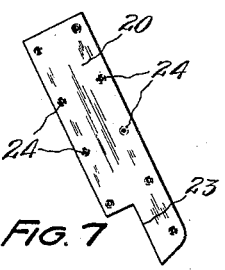
FIG. 5
FIG. 7
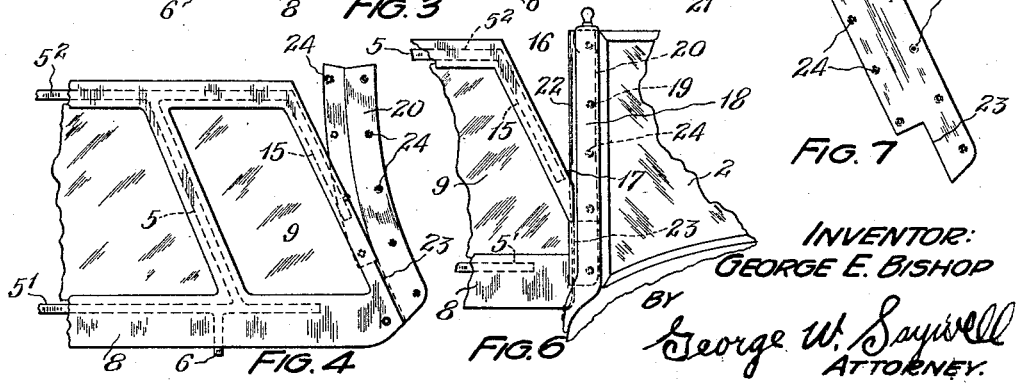
FIG. 4     FIG. 6
INVENTOR:
GEORGE E. BISHOP
BY
George W. Saywell
ATTORNEY.

Patented May 31, 1932

1,860,983

UNITED STATES PATENT OFFICE

GEORGE E. BISHOP, OF CLEVELAND HEIGHTS, OHIO

AUTOMOBILE DOOR CURTAIN

Application filed July 18, 1930. Serial No. 468,768.

The invention particularly relates to door curtains with fabric bodies for use with automobiles of the so-called touring type, particularly the sport model open car. It is will known that oftentimes such type of car is provided with wide doors, providing easy entrance to the car seat, and this wide-door construction is coupled with a windshield setting which includes an upward rearwardly-extending slant of the windshield. It results that in such a combination the upward projection of the line of the automobile door hinges intersects the windshield a material distance below the top of the latter, so that a curtain attachment to the windshield becomes impossible without the use of springs or other elastic devices for lengthening the upper edge of the curtain when the door is open and for shortening this edge of the curtain when the door is closed. If a space or opening is formed in the curtain when the door is opened, some means must be provided for closing this opening, or making a close adaptation of the curtain to the windshield, when the door is closed. Oftentimes also the door is so hung as to drop at its opening edge when opened and this construction requires a longer upper curtain edge when the door is open than when it is closed. Furthermore, the car body construction may be such as to cause the door and (or) the curtain mounted on the latter to so swing, when the door is opened, that more curtain material is required when the door is open than when it is shut, if a free opening movement of the door is to be obtained. To satisfy these requirements, without the necessity of using springs, and to accomplish the purpose in a one-piece curtain, and independently of the car top, I have invented an improved metal frame for use with improvements in the fabric curtain proper, which insures the close adaptation of the curtain to the windshield irrespective of the conditions which normally would prevent this close adaptation.

The annexed drawings and the following description set forth in detail certain means embodying my invention, such disclosed means constituting, however, but two of the various forms in which the principle of the invention may be embodied.

In said annexed drawings:

Figure 1 is a side elevation of one form of my improved door curtain mounted upon an automobile door which is shown in closed position, a fragmentary portion of the automobile body being also shown;

Figure 2 is a plan view of the elements shown in Figure 1;

Figure 3 is an elevation of the curtain only, the same being shown in fully open position;

Figure 4 is an elevation of a fragmentary portion of a modified form of curtain in fully open position;

Figure 5 is a fragmentary plan section of the form of curtain shown in Figure 4, together with a windshield post with which the same is associated, the curtain being in closed position;

Figure 6 is a view of the form of curtain shown in Figure 4, taken from the front of the automobile, and showing the respective positions of the several elements when the automobile door is open; and Figure 7 is a perspective of a special fabric element detached from the fabric panel with which it is normally integrally incorporated to form the type of curtain shown in Figure 4.

Referring to the annexed drawings in which the same parts are indicated by the same several numbers in the different views, an automobile body 1 has a windshield 2 and a door 4. The windshield 2 is shown as having a material rearward slant from bottom to top so that it is intersected intermediate its top and bottom by the upward projection of the line of the door hinges 10. Mounted within suitable sockets 7 formed in the upper edge of the door 4 is a U-shaped strengthening frame 5 secured within and adjacent the upper, lower and one side edge of a fabric door curtain 8. This frame 5, as shown, has its open side adjacent the windshield post 3 and is provided with a stiffening member connecting intermediate portions of the upper and lower arms $5^2$ and $5'$. One or more supports 6, as desired, may be utilized for supporting the fabric panel 8 and U-frame 5 upon the door 4. The lower arm 5′ of the U-shaped frame may be of any suitable and desired length. The fabric panel 8 is fastened adjacent its forward lower end to the body 1 by eyelets 21.

Because of the slant of the windshield 2, the length of the fabric in the upper part of the panel 8 is insufficient to provide a fabric hinge 4 when the door 4 is opened. Some means must be provided for lengthening the fabric in such upper part of the panel body 8 when the door is open. If the curtain construction is such as to create an open space by the opening of the supporting automobile door, then means must be provided for closing the space in the fabric body, when the door is closed. My invention provides these means in a one-piece curtain and also insures the positive opening and closing of such means, or the closing of the fabric space when the door is closed, and the tight adaptation of the curtain to the windshield.

Referring particularly to the construction shown in Figures 1, 2, and 3, I have provided additional fabric material 13, forming part of the fabric section 12, and at the top of the latter, for filling the upper portion of the curtain body 8 where the fabric material is too short to permit a free opening of the door. The fabric section 12 is integral with the main fabric body 8 and the additional material 13 extends downwardly in triangular formation to a point 14 substantially in vertical-alignment with the door hinges 10 or to substantially the top of the lower fabric hinge of the fabric body 8. Below the point 14 the fabric material is long enough to permit free opening of the door 4 and above the point 14 it is too short to permit such free opening. The fabric section 12 is provided with a series of eyelets 11, adjacent its forward edge adapted to be secured to the windshield post 3. In Figure 3, the entire fabric panel as thus designed with the section 12 and the additional material 13 is shown fully open and before being secured to the windshield post 3. After the panel is secured to the windshield post 3 and, if the door 4 is closed, the section 12 and additional material 13 take the folded form shown in plan in Figure 2. It is evident that the section 12 and additional material 13 divide along the fold line 13′, and the material 13 lies adjacent the fabric panel 8 proper and the upper part 12′ of the section 12, forwardly of the fold line 13′, lies adjacently within the section 13, and next to the windshield post 3.

In order that a tight adaptation of the material 13 to the windshield post 3 may be assured, I extend the upper leg 5² of the strengthening frame 5 downwardly at the free end of the leg 5², to form a frame portion 15, this frame portion 15 following the line of the post 3 and extending downwardly to a point adjacently above the top of the fabric hinge of the curtain. This construction stiffens the edge of the curtain 8 adjacent the rear edge of the material 13, thus affording a tight adaptation of the curtain to the windshield post, and also makes possible the provision of a large forward outlook 9 which extends very close to the windshield post 3 and insures clear vision for safe driving. The described construction affords a bellows effect from the point 14 to the upper edge of the curtain, which bellows is positively open and closed, during the operation of the door 4, by the downwardly extending frame portion 15.

In Figures 4, 5, 6, and 7, I have shown one possible arrangement if the hinge difference at the upper edge of the curtain is too great to utilize a bellows arrangement or, if for other reasons, it is not desired to utilize the bellows arrangement. The particular construction shown in Figures 4, 5, 6, and 7 consists in a bumper arrangement combined with means which afford a triangular shaped open space in the curtain when the door is open. Specifically, I have provided as an integral part of the fabric panel 8 a fabric strip 20 secured to the panel body along the line 23 and provided with a double series of eyelets 24, one series adjacent each edge, which are fastened over buttons 19 upon the windshield post 18, so as to provide a bumper 22 against which the depending frame member 15 may contact to form a tight joint, in the closed position of the door, as plainly shown in Figure 5. It is evident that this construction also will provide a close adaptation of the curtain edge to the windshield post, when the door is closed, and that when the door is opened, a triangular shaped space 16 will be formed between the top of the fabric panel 8 and the top of the windshield post 18 which will taper down to a point 17, Figure 6, thus furnishing the desired effective lengthening and shortening of the curtain during the door operation.

What I claim is:

1. A frame for an automobile door curtain comprising a U-shaped member provided with stiffening means connecting intermediate portions of the two arms of the U and formed with a portion inwardly extended from a point adjacent the free end of one arm of the U and forming an obtuse angle with said arm.

2. An automobile door curtain for use where the forward edge of the curtain is not entirely in front of or vertically-aligned with the hinge line of the vehicle door when the door is open, comprising a one-piece fabric curtain body provided with outlook means and formed for attachment at its outer edge to a support, said body having a fabric hinge at the bottom and extending a material distance upwardly, said body being split above said fabric hinge so as to separate and form an open space when the curtain is carried out by the opening of the door, and a strengthening frame for said curtain body, the body being formed with bumper means adjacent the forward edge of said space, said frame being formed with means for cooperation with said bumper means to seal the space when the door is closed, said frame having means for mounting the curtain upon the door.

3. An automobile door curtain for use where the forward edge of the curtain is not entirely in front of or vertically-aligned with the hinge line of the vehicle door when the door is open, comprising a one-piece fabric curtain body provided with outlook means and formed for attachment at its forward edge to a support, said body having a fabric hinge at the bottom and extending a material distance upwardly, said body being split above said fabric hinge so as to separate and form an open space when the curtain is carried out by the opening of the door, and a strengthening frame for said curtain body, said frame having an extension adjacent the rear edge of said space, said curtain body being formed with bumper means adjacent the forward edge of said space for cooperation with said frame extension to seal the space when the door is closed, said frame also having means for mounting the curtain upon the door.

4. An automobile door curtain for use where the forward edge of the curtain is not entirely in front of or vertically-aligned with the hinge line of the vehicle door when the door is open, comprising a one-piece fabric curtain body provided with outlook means and formed for attachment adjacent the bottom of its forward edge to a support, said fabric body having additional material for filling the upper portion of the curtain body from the top of the latter downwardly to a point where the fabric material is long enough to permit free opening of the door, said additional material being formed with means for attachment to a support, and a strengthening frame for said curtain body, said frame having an extension adjacent the rear edge of the additional material for positively opening and folding the latter as the door is opened and closed, said frame also having means for mounting the curtain upon the door.

5. An automobile door curtain for use where the forward edge of the curtain is not entirely in front of or vertically-aligned with the hinge line of the vehicle door when the door is open, comprising a one-piece fabric curtain body provided with outlook means, said fabric body having additional material for filling the upper portion of the curtain body where the fabric material is too short to permit free opening of the door, said additional material and the body material below the latter being formed for attachment at the forward edge to a curtain support, and a strengthening frame for said curtain body, the frame being provided with means for positively opening and folding the additional material as the door is opened and shut, said frame being also formed with means for mounting the curtain upon the door.

6. A frame for an automobile door curtain comprising a lower arm having means for mounting the curtain on an automobile door of the open car type, an upper arm spaced therefrom, means supporting one end of said upper arm upon said lower arm, the other end of said upper arm having an extension projecting downwardly at an obtuse angle and terminating in a free end, and a stiffening member connecting the intermediate portion of said upper arm to said lower arm.

7. A frame for an automobile door curtain comprising a lower arm adapted for attachment to the curtain near the lower edge thereof and having means for mounting the curtain on an automobile door, an upper arm spaced from said lower arm and adapted for attachment to the upper portion of the curtain, means supporting one end of said upper arm on said lower arm, said upper arm having an extension near its other end projecting at an obtuse angle only part way to the lower edge of the curtain, and a stiffening member connecting said upper and lower arms.

8. A frame for an automobile curtain comprising a substantially U-shaped member having a lower arm adapted for attachment to the curtain near the lower edge thereof, an upper arm adapted for attachment to the upper portion of the curtain, said upper arm having an extension at the open end of the U projecting toward the lower edge of the curtain, and stiffening means connecting the intermediate portion of said upper arm to said lower arm, the end of said extension being free from the remainder of the frame.

9. A frame for an automobile curtain comprising a substantially U-shaped member having a lower arm adapted for attachment to the curtain near the lower edge thereof, an upper arm adapted for attachment to the upper portion of the curtain, and an extension of said upper arm at the open end of the U projecting at an obtuse angle toward the lower edge of the curtain and terminating in a free end.

10. An automobile door curtain comprising a fabric curtain body having a portion adapted to extend beyond the hinge line of an automobile door for only a part of the height of the curtain, and a frame including a lower arm attached to the curtain near its lower edge and having means for mounting the curtain on the automobile door, an upper arm attached to the upper portion of the curtain and connected at one end to said lower arm, said upper arm having an extension projecting at an obtuse angle only part way to the lower edge of the curtain, and a stiffening member connecting said upper and lower arms, said extension extending substantially to the hinge line of the door.

11. An automobile door curtain comprising a fabric curtain body having a portion adapted to extend beyond the hinge line of an automobile door for only a part of the height of the curtain, and a substantially U-shaped frame having a lower arm attached to the curtain near its lower edge, an upper arm attached to the upper portion of the curtain, said upper arm having an extension at the open end of the U projecting at an obtuse angle toward the lower edge of the curtain and terminating in a free edge substantially at the hinge line of the door, and means for mounting the curtain on the door.

12. An automobile door curtain comprising a fabric curtain body having a portion adapted to extend beyond the hinge line of an automobile door for only a part of the height of the curtain and provided with means for attachment to a support; a substantially U-shaped frame having a lower arm attached to the curtain near its lower edge, an upper arm attached to the upper portion of the curtain, said upper arm having an extension at the open end of the U projecting only part way to the lower edge of the curtain and terminating substantially in the hinge line of the door, and stiffening means connecting said upper and lower arms; and means on said frame for mounting the curtain on the door.

Signed by me this 11th day of July, 1930.

GEORGE E. BISHOP.